US009756216B2

(12) United States Patent
Tonegawa

(10) Patent No.: US 9,756,216 B2
(45) Date of Patent: Sep. 5, 2017

(54) METHOD AND SYSTEM FOR AUTHENTICATING USERS IN AN IMAGE PROCESSING APPARATUS AND/OR IMAGE PROCESSING SYSTEM

(71) Applicant: CANON KABUSHIKI KAISHA, Tokyo (JP)

(72) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 13/868,593

(22) Filed: Apr. 23, 2013

(65) Prior Publication Data

US 2013/0286420 A1 Oct. 31, 2013

(30) Foreign Application Priority Data

Apr. 26, 2012 (JP) ................................ 2012-100974

(51) Int. Cl.
*H04N 1/44* (2006.01)
*H04N 1/00* (2006.01)

(52) U.S. Cl.
CPC ............. *H04N 1/44* (2013.01); *H04N 1/4413* (2013.01); *H04N 1/4426* (2013.01); *H04N 1/00244* (2013.01); *H04N 1/00408* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2002/0087894 A1* | 7/2002 | Foley | H04L 63/083 726/4 |
| 2005/0159145 A1* | 7/2005 | Urakawa | H04L 12/585 455/418 |
| 2005/0174592 A1* | 8/2005 | Iinuma | H04L 12/58 358/1.13 |
| 2005/0213720 A1* | 9/2005 | Kawasaki | H04M 3/42 379/100.15 |
| 2006/0050303 A1* | 3/2006 | Oomori et al. | 358/1.15 |
| 2006/0256392 A1* | 11/2006 | Van Hoof et al. | 358/402 |
| 2007/0150536 A1* | 6/2007 | Ahmed et al. | 709/203 |
| 2010/0134822 A1* | 6/2010 | Kimura et al. | 358/1.14 |
| 2010/0141987 A1* | 6/2010 | Miyamoto | H04N 1/00222 358/1.15 |
| 2011/0261386 A1* | 10/2011 | Kasuya | G06F 21/608 358/1.14 |
| 2011/0265144 A1* | 10/2011 | Ikeda et al. | 726/3 |
| 2012/0327465 A1* | 12/2012 | Yamada | G06F 21/305 358/1.15 |
| 2013/0235413 A1* | 9/2013 | Terao | G06F 21/608 358/1.14 |

FOREIGN PATENT DOCUMENTS

JP 2006-101484 A 4/2006

* cited by examiner

*Primary Examiner* — Ming Hon
(74) *Attorney, Agent, or Firm* — Canon USA Inc., IP Division

(57) ABSTRACT

In a multifunction peripheral (MFP) including an operation key for setting a folder of an authenticated user as an address of image data, setting received authentication information or setting pre-registered authentication information that has been associated with a user is selected, and when the operation key is operated, the authentication information is set according to the selected content. The image data is then processed using the set authentication information.

14 Claims, 13 Drawing Sheets

FIG.4

| 401 | | |
|---|---|---|
| A1001 | PASSWORD | secret33 | 402 |
| A1002 | | |
| A1003 | NAME | Taro Tanaka | 403 |
| A1004 | GROUP TO WHICH THE USER BELONGS | users | 404 |
| ⋮ | PASSWORD CHANGE | YES | 405 |
| | PASSWORD TIME LIMIT | UNLIMITED | 406 |
| | E-MAIL ADDRESS | tanaka@abc.co.jp | 407 |
| | FOLDER HOST NAME | server.abc.co.jp | 408 |
| | FOLDER PATH | /user/tanaka | 409 |

FIG.7

USER SETTING (A1001)

■ FOLDER HOST NAME

| server.abc.co.jp | ~701

■ FOLDER PATH

| /home/tanaka | ~702

■ USER NAME

| tanaka | ~703

■ PASSWORD

| secret55 | ~704

FIG.10A

```
LOG IN
┌─────────────────────────────────────┐
│                                     │
│  INPUT AUTHENTICATION INFORMATION.  │
│                                     │
│  ■ USER ID                          │
│    ┌───────────────────────┐        │
│    │                       │──1001  │
│    └───────────────────────┘        │
│                                     │
│  ■ PASSWORD                         │
│    ┌───────────────────────┐        │
│    │                       │──1002  │
│    └───────────────────────┘        │
│                                     │
└─────────────────────────────────────┘
```

FIG.10B

```
LOG IN
┌─────────────────────────────────────┐
│                                     │
│                                     │
│                                     │
│   HOLD IC CARD OVER CARD READER.    │
│                                     │
│                                     │
│                                     │
└─────────────────────────────────────┘
```

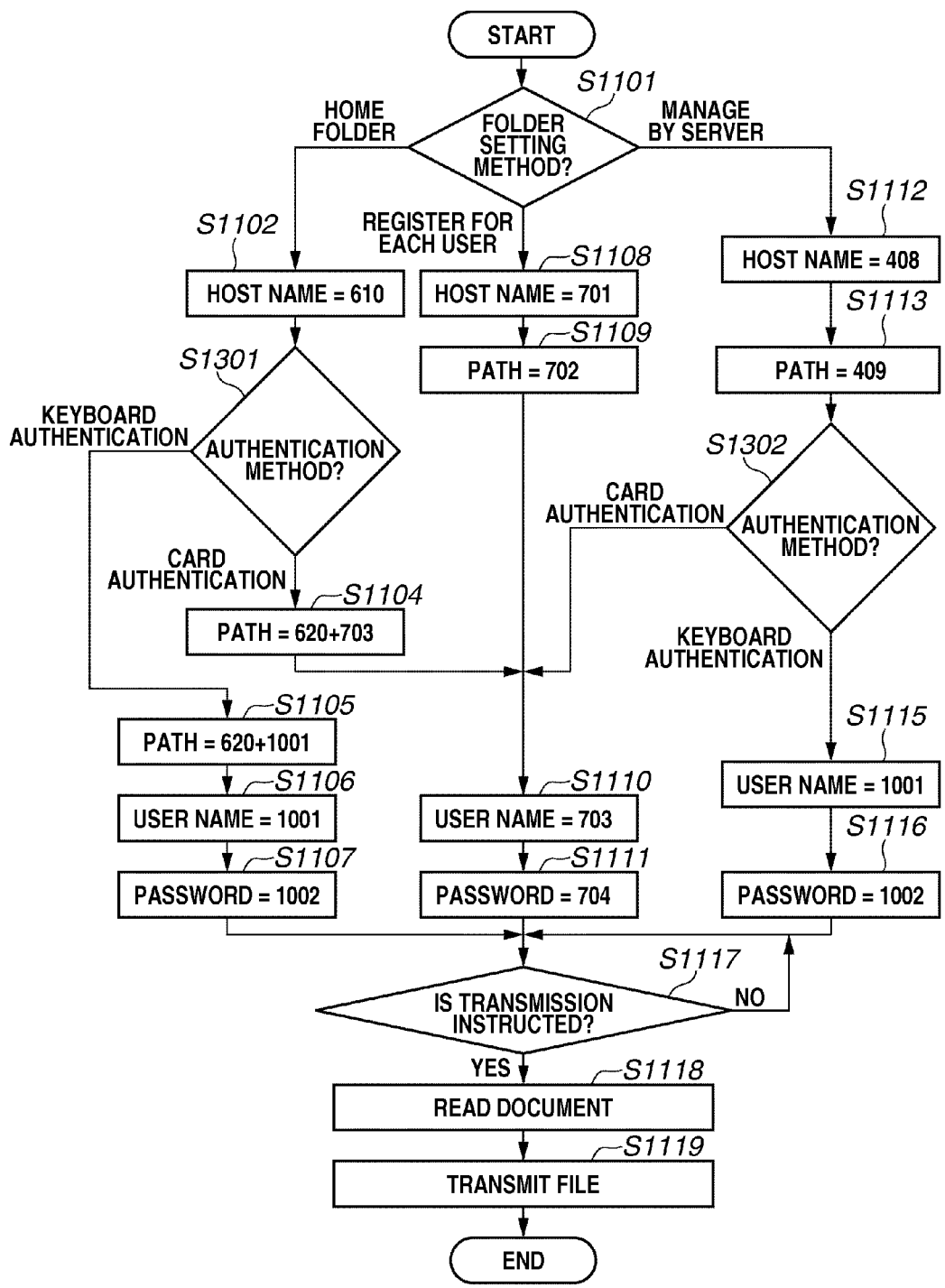

METHOD AND SYSTEM FOR AUTHENTICATING USERS IN AN IMAGE PROCESSING APPARATUS AND/OR IMAGE PROCESSING SYSTEM

BACKGROUND

Field

Aspects of the present invention generally relate to an image processing system capable of processing image data, an image processing apparatus, a control method therefor, and a computer readable storage medium.

Description of the Related Art

Conventionally, an image processing apparatus including an operation key of "e-mail to yourself" has been known (Japanese Patent Application Laid-Open No. 2006-101484). According to Japanese Patent Application Laid-Open No. 2006-101484, when the operation key of "e-mail to yourself" is operated, an e-mail address of a user operating the image processing apparatus is set as an address of image data. With this setting, when the user wants to transmit the image data to his/her own e-mail address, the user does not need to input it, thereby reducing the user's works.

Japanese Patent Application Laid-Open No. 2006-101484 indicates the operation key of "e-mail to yourself" for setting the e-mail address. In addition to this operation key, another operation key of "transmit file to yourself" may be provided for the image processing apparatus. The term of "transmit file" means to transmit the image data using a protocol such as Server Message Block (SMB) and File Transfer Protocol (FTP). In addition, distributed authoring and versioning protocol for the World Wide Web (WWW) (Web DAV) is also known as one of the protocols for transmitting a file.

In the image processing apparatus including the operation key of "transmit file to yourself", in response to an operation by the operation key of "transmit file to yourself", a folder of the user operating the image processing apparatus is set as an address of the image data. With this setting, when the user wants to transmit the image data to his/her own folder (to store in the own folder), the user does not need to input folder information indicating the own folder, thereby reducing the user's works.

When the file is transmitted, in addition to information (host name) indicating an apparatus managing the folder that is a storage destination of the image data and location information (path) about the folder, authentication information (user name and password) for accessing an addressed apparatus is required.

When the addressed apparatus to which the image data is transmitted is located in the same domain as the image processing apparatus from which the image data is transmitted, the user's authentication information is often managed in an integrated manner in the domain. In such a case, the authentication information used to login to the image processing apparatus may be the same as the authentication information required to access the addressed apparatus to which the file is transmitted.

When the same authentication information can be used, a user identification (ID) and the password input by the user to login to the image processing apparatus can be continuously used as the user name and the password for transmitting the image data in a file. With this arrangement, the authentication information for logging into the image processing apparatus and the authentication information as the address for the file transmission are not required to be individually input, thereby reducing the user's works.

On the other hand, in recent years, using an integrated circuit (IC) card to login to the image processing apparatus has been known. The user is not requested to input the password, when using the IC card to login to the apparatus. That is because the fact that a person holds the IC card certifies that the person is the user himself/herself.

When the above-described authentication information is to be continuously used, and if the IC card is used to login, a problem will arise. That is because, since the user does not input the password when logging into the apparatus using the IC card, the password to be continuously used does not exist so that the file cannot be transmitted. Further, if the user inputs the password when logging in or transmitting the file, the file can be transmitted, while the user needs to input the password each time logging into the apparatus or transmitting the file.

SUMMARY

An aspect of the present invention generally relates to a mechanism for setting authentication information by an appropriate method when processing is performed on image data with a user's folder set as an address.

One aspect of the present invention provides an image processing system including a reception unit configured to receive authentication information, an authentication unit configured to authenticate a user based on the authentication information received by the reception unit, an operation key configured to set a folder of the user as an address of image data, a selection unit configured to select whether to set the authentication information received by the reception unit or pre-registered authentication information associated with the user, a setting unit configured to set, when the operation key is operated, according to content selected by the selection unit, the authentication information received by the reception unit or the pre-registered authentication information, and a processing unit configured to process the image data using the authentication information set by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates information managed by the authentication server according to the exemplary embodiment.

FIG. 7 illustrates an operation screen of the MFP according to the exemplary embodiment.

FIGS. 10A and 10B illustrate operation screens of the MFP according to the exemplary embodiment.

FIG. 13 is a flowchart illustrating an operation performed by the MFP when "transmit file to yourself" is selected according to the exemplary embodiment.

DESCRIPTION OF THE EMBODIMENTS

Various exemplary embodiments, features, and aspects of the invention will be described in detail below with reference to the drawings.

Exemplary embodiments described below are not limiting, and all combinations of the features described in the exemplary embodiments are not essential for the solutions of the invention.

Figure 1:
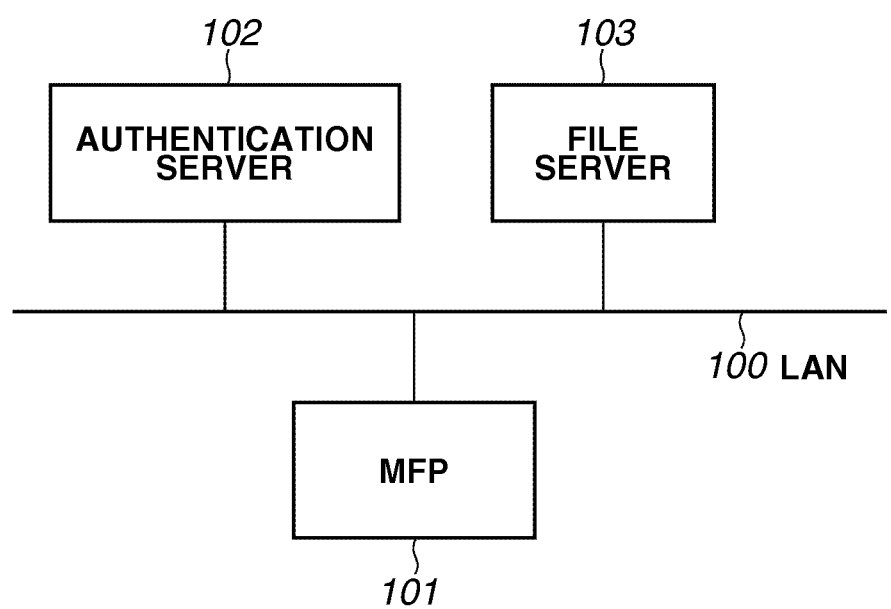
FIG. 1 illustrates an image processing system according to an exemplary embodiment.

A first exemplary embodiment will now be described. FIG. 1 illustrates an image processing system according to the first exemplary embodiment.

On a local area network (LAN) 100, an MFP 101, an authentication server 102, and a file server 103 are communicably connected with one another. The MFP 101 is an example of the image processing apparatus. The authentication server 102 is an example of an authentication apparatus. The file server 103 is an example of a file management device. The MFP 101 can transmit a file of image data using SMB, FTP, and WebDAV with a folder in the file server 103 set as an address. A folder in the MFP 101 in addition to the file server 103 can also be set as an address. Further, the MFP 101 can transmit the image data by an e-mail via a mail server (not illustrated). In another exemplary embodiment, the image processing system includes just the MFP 101 and the authentication server 102.

Figure 2:
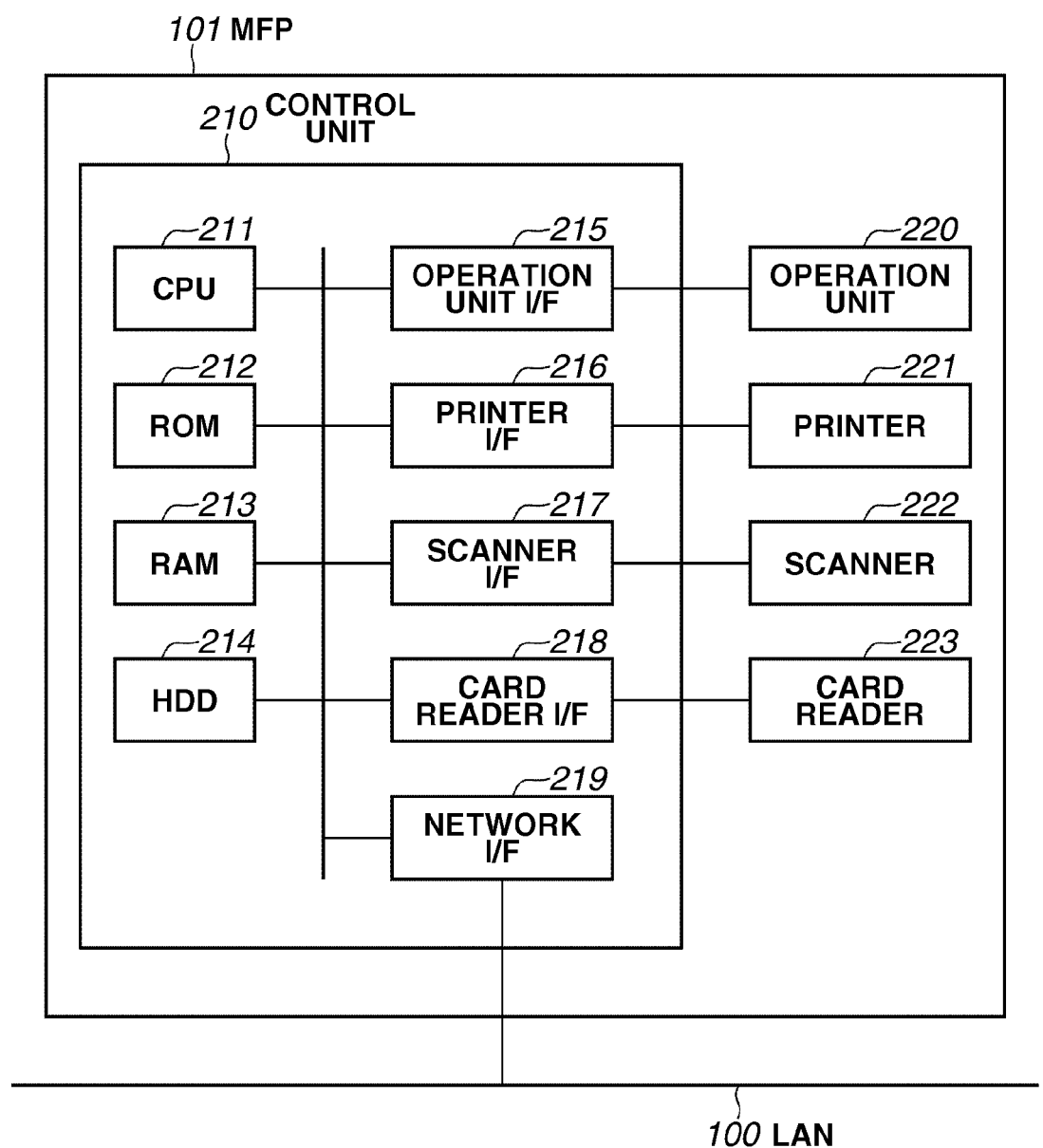
FIG. 2 is a block diagram illustrating a configuration of a multifunction peripheral (MFP) according to the exemplary embodiment.

FIG. 2 is a block diagram illustrating a configuration of the MFP 101.

A control unit 210 including a central processing unit (CPU) 211 controls operation of the MFP 101. The CPU 211 reads a control program stored in a read-only memory (ROM) 212 to perform various types of controls such as reading control and transmission control. A random access memory (RAM) 213 is used as a temporary storage region of a main memory and a work area of the CPU 211. In a case of the MFP 101, one CPU 211 executes each processing illustrated in the flowchart described below using one memory (RAM 213 or hard disk (HDD) 214). However, other exemplary embodiments may be adopted. For example, each processing illustrated in the flowchart described below can be executed using a plurality of CPUs and a plurality of RAMs or HDDs that cooperate with one another.

The HDD 214 stores image data and various types of programs. An operation unit interface (I/F) 215 connects an operation unit 220 with a control unit 210. The operation unit 220 includes a liquid crystal display unit having a touch panel function and a keyboard.

A printer I/F 216 connects a printer 221 with the control unit 210. The image data to be printed by the printer 221 is transferred from the control unit 210 via the printer I/F 216, and then printed onto a recording medium by the printer 221.

A scanner I/F 217 connects a scanner 222 with the control unit 210. The scanner 222 reads an image on a document to generate image data (image file), and then inputs it to the control unit 210 via the scanner I/F 217. The MFP 101 can transmit the image data (image file) generated by the scanner 222 via file transfer or via e-mail.

A card reader I/F 218 connects a card reader 223 with the control unit 210. The card reader 223 reads a user ID recorded in a mobile recording medium (IC card), and then inputs it into the control unit 210. The card reader 223 can be a contact type or a non-contact type reader.

A network I/F 219 connects the control unit 210 (MFP 101) with the LAN 100. The network I/F 219 transmits the image data and information to an external apparatus (e.g., authentication server 102 and file server 103) on the LAN 100 and receives various types of information from the external apparatus thereon.

Figure 3:
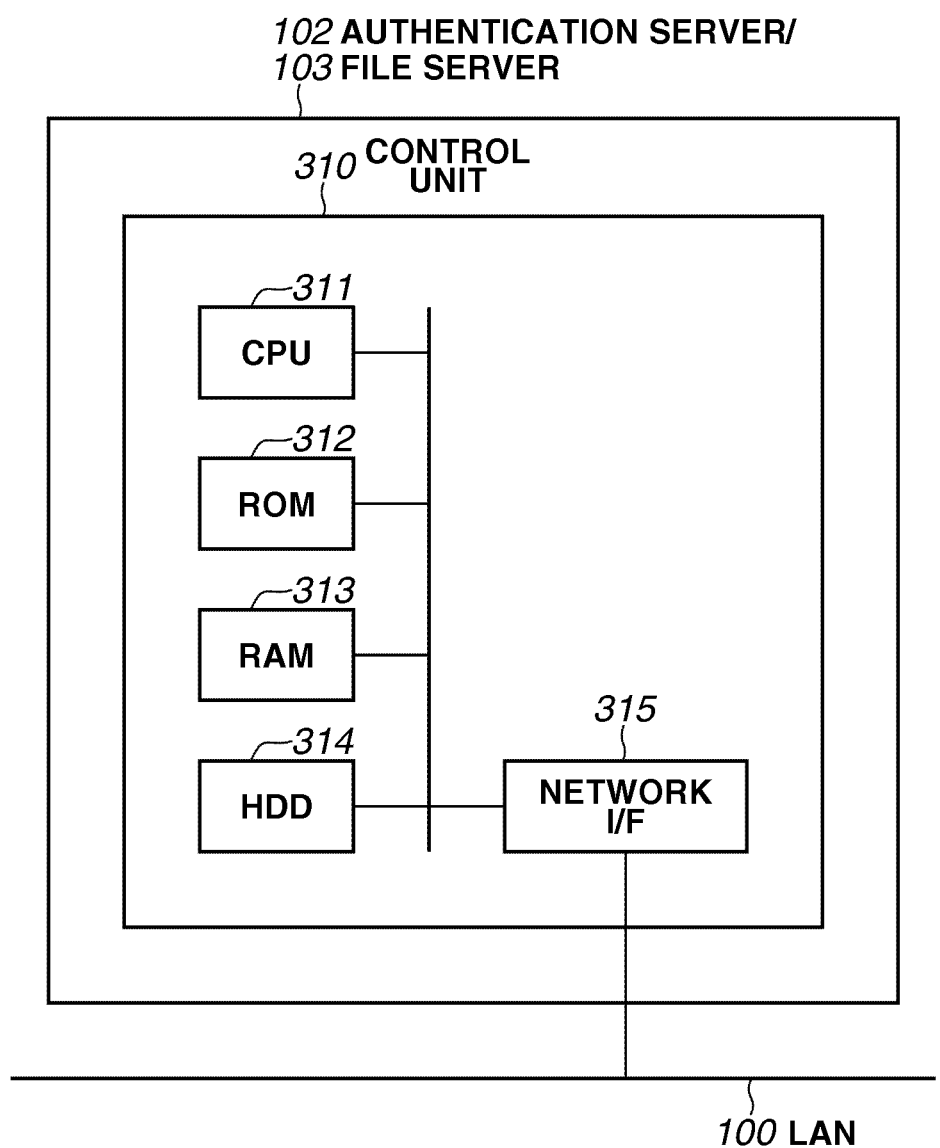
FIG. 3 is a block diagram illustrating a configuration of an authentication server and a file server according to the exemplary embodiment.

FIG. 3 is a block diagram illustrating the authentication server 102.

A control unit 310 including a CPU 311 controls operation of the authentication server 102. The CPU 311 reads a control program stored in a ROM 312 to execute various types of control processing. A RAM 313 is used as a temporary storage region of a main memory and a work area of the CPU 311. An HDD 314 stores image data and various types of programs.

A network I/F 315 connects the control unit 310 (authentication server 102) with the LAN 100. The network I/F 315 transmits/receives various types of information to/from another apparatus on the LAN 100. Since a configuration of the file server 103 is the same as that of the authentication server 102, a detailed description of the file server 103 is not provided herein.

FIG. 4 illustrates information in the HDD 314 managed by the authentication server 102.

The authentication server 102 manages the domains including the image processing system illustrated in FIG. 1, and further manages information 401 and 402 required to authenticate the user, and information 403 to 409 about the user for each user. The information 401 indicates the user IDs for uniquely indicating the user and can be, for example, employee codes of a company where the MFP 101 is installed.

FIG. 4 illustrates information about the user corresponding to the user ID of A1001. When the keyboard authentication is performed as described below, and when the user of A1001 starts to use the MFP 101, the user is requested to input "A1001" as the user ID and "secret33" as the password. The authentication information (user ID and password) input to the MFP 101 is transmitted to the authentication server 102. The authentication server 102 checks whether the authentication information (user ID and password) transmitted from the MFP 101 corresponds to the information managed as the information 401 and 402. If they correspond to each other, the authentication server 102 notifies the MFP 101 of the authentication "OK". On the other hand, if the authentication information does not correspond to the information 401 and 402, the authentication "NG" is notified to the MFP 101.

When the card authentication is performed as described below, the user ID read from the IC card is transmitted to the authentication server 102. The authentication server 102 checks whether the user ID transmitted from the MFP 101 corresponds to the information managed as the information 401. If they correspond to each other, the authentication "OK" is notified to the MFP 101. On the other hand, if the user ID does not correspond to the information 401, the authentication "NG" is notified to the MFP 101. The user is not requested to input the password when logging in using the IC card. That is because the fact that a person holds the IC card certifies that the person is the user.

When the user is normally authenticated, information 403 to 409 is notified to the MFP 101 with the authentication "OK". The information 403 indicates that a name of the user of A1001 is "Taro Tanaka". The information 404 indicates that the user of A1001 belongs to a group of "users". The information 405 indicates whether the user of A1001 can change the password managed as the information 402. When the information 405 indicates "NO", only a system administrator can change the password of the information 402.

The information 406 indicates an expiration date of the password managed as the information 402. When the information 406 indicates "unlimited", the password of the information 402 can be used for an unlimited time. When the time limit is set for the information 406, and when the time limit approaches, the user is requested to change the password. The information 407 indicates an e-mail address of the user of A1001. The user of A1001 can receive an e-mail transmitted with the e-mail address that is managed as the information 407 and set as the address. Information 408 and 409 indicates the host name and the path of a device where the folder of the user of A1001 is located. The user of A1001 can access the folder indicated by the information 408 and 409, and acquire the data stored in the folder.

Figure 5:
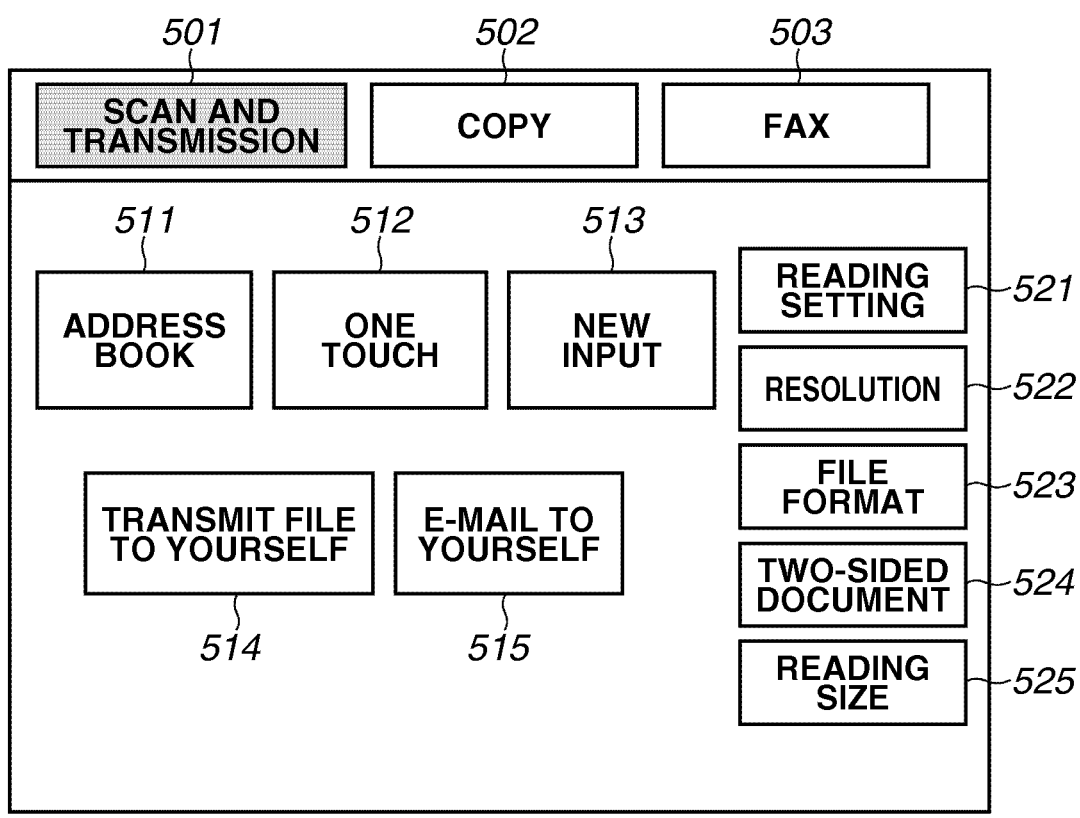
FIG. 5 illustrates an operation screen of the MFP according to the exemplary embodiment.

FIG. 5 illustrates an example of an operation screen displayed on the operation unit 220.

The user can select a function by operating any of operation keys 501 to 503 on the screen illustrated in FIG. 5. FIG. 5 illustrates a state where the operation key 501 is selected. FIG. 5 illustrates "scan and transmission", "copy", and "fax" as functions. However, the MFP 101 may include other functions in addition to those functions.

The user selecting the operation key 501 can set the address of the image data to be transmitted by operating any of operation keys 511 to 515. When the operation key 511 is operated, content of an address book held in the HDD 214 is displayed, and then the user can set the content as the address of the image data with reference to the content registered in the address book.

When the operation key 512 is operated, a list of one-touch keys is displayed. One or a plurality of addresses is pre-associated with each one-touch key, and thus the user can set the content associated with the one-touch key as the address of the image data by operating the desired one-touch key. When the operation key 513 is operated, a screen for receiving a new input of address information from the user is displayed. The user inputs the address information via the displayed screen, and can set the address information as the address of the image data.

An operation key 514 is operated when the user wants to set his/her own folder as the address of the image data. When the user operates the operation key 514, a folder of his/her own is automatically set as the address of the image data (details will be described below). An operation key 515 is operated when the user wants to set his/her e-mail address as the address of the image data. When the user operates the operation key 515, the e-mail address of his/her own is automatically set as the address of the image data.

An operation key 521 is used to set reading color/black and white. An operation key 522 is used to set a reading resolution. An operation key 523 is used to set a file format of the image data to be transmitted. An operation key 524 is used to set one-sided/two-sided reading. An operation key 525 is used to set a reading size.

Figure 6:
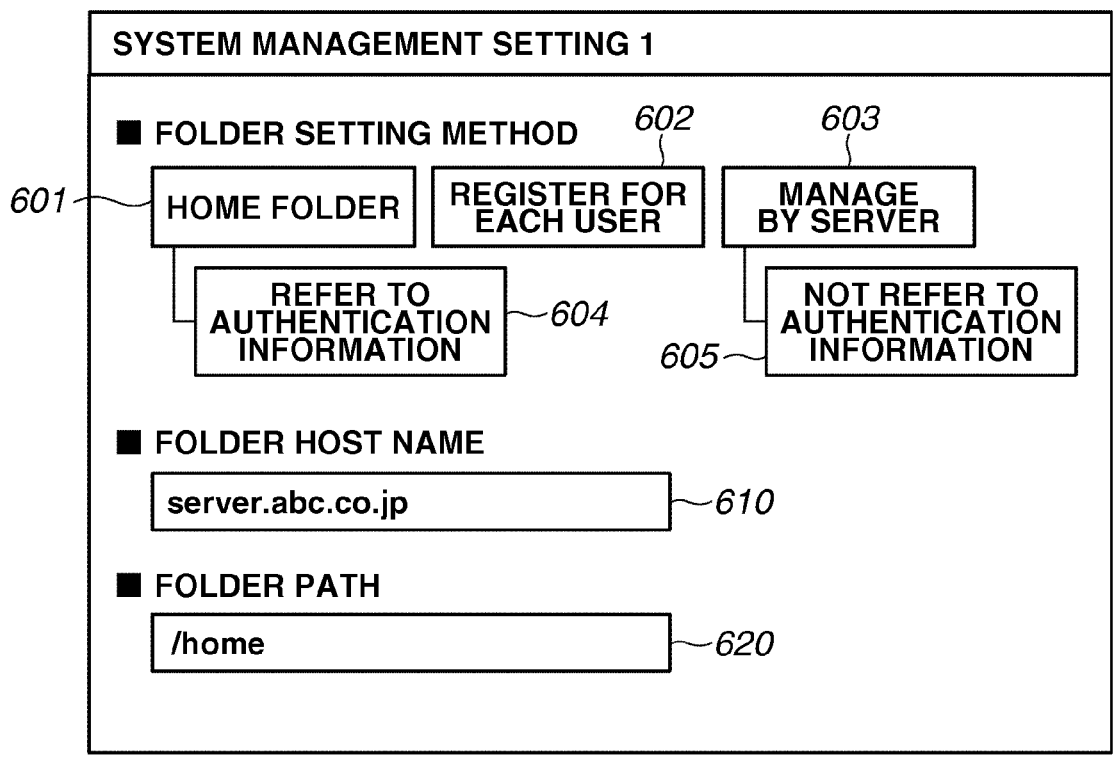
FIG. 6 illustrates an operation screen of the MFP according to the exemplary embodiment.

FIG. 6 illustrates an example of the operation screen (first operation screen) displayed on the operation unit 220.

The screen illustrated in FIG. 6 can be operated only by a system administrator, and is not displayed when general users operate the MFP 101. The system administrator can select a method for setting the folder when the operation key 514 is operated by an operation of any of operation keys 601 to 603.

The MFP 101 is provided with three methods of setting the folder: "home folder", "register for each user", and "manage by server". "Home folder" indicates a method in which system administrator pre-registers a part of the host names and the paths of the folders to the MFP 101 as the information to be shared by a plurality of users, and such information is set as an address of the image data. A system administrator pre-registers the part of the host names 610 and the paths 620 of the folders to be used when "home folder" is selected. This setting method has an advantage that, since each user's folder can be located in the same host and/or the same folder, for example, a system administrator can easily manage the folders.

"Register for each user" indicates a method in which the general users pre-register folder information (host name, path, user name, and password) about each user to MFP 101, and then such information is set as an address of the image data. Details of the registration will be described below with respect to FIG. 7. Since the user can register an arbitrary folder as the user's own folder using this setting method, this method is user-friendly.

"Manage by server" indicates a method in which the information managed by the authentication server 102 as the information 408 and 409 illustrated in FIG. 4 is set as an address of the image data. By this setting method, since the folder for each user is integrally managed by the server, a user's work of updating the folder information can be reduced when the folder information is required to be updated.

Since the MFP 101 is provided with the "home folder", "register for each user", and "manage by server" methods, the method for setting the folder can be selectively switched. More specifically, "home folder" can be selected for easy management of the folder, "register for each user" can be selected for user's convenient usage having a higher priority, and "manage by server" can be selected for the integral management of the folders by the server. The selection can be made based on a number of factors like, for example, the environment where the MFP 101 is located/installed.

The authentication information can be continuously used by the MFP 101. When the apparatus to which the image data is addressed is located in the same domain as the MFP 101 from which the image data is transmitted, the user's authentication information is often managed in an integrated manner in the domain. In such a case, the authentication information used to login to the MFP 101 may be the same as the authentication information required to access the addressed apparatus to which the image data is to be transmitted. When the same authentication information is used, the user ID and the password input by the user to login to the MFP 101 can be continuously used as the user name and the password for transmitting the image data. With this arrangement, the authentication information for logging into the MFP 101 and the authentication information as the address for the file transmission are not required to be individually input, thereby reducing the user's workload.

When the IC card is used to login to the MFP 101, the user ID can be acquired by reading the user ID recorded in the IC card, but the password cannot be acquired. Therefore, even if the authentication information is to be continuously used, since the password to be continuously used does not exist, the file cannot be transmitted and a transmission error results.

According to the first exemplary embodiment, the screen illustrated in FIG. 6 includes operation keys 604 and 605. The operation key 604 alternately switches between "refer to authentication information" and "not refer to authentication information" each time it is operated. Similarly, the operation key 605 also alternately switches between "refer to authentication information" and "not refer to authentication information" each time it is operated. When "not refer to authentication information" is selected, the user ID and the password input by the user to login to the MFP 101 are continuously used as the user name and the password for transmitting the image data.

When "refer to authentication information" is selected, the user ID and the password input by the user to login to the MFP 101 are not continuously used. Instead, with reference to the folder information illustrated in FIG. 7 and registered for "register for each user", the user name (information 703) and the password (information 704) included in the folder information are used as the user name and the password for transmitting the image data in a file.

The operation key 604 can be operated only when "home folder" is selected using the operation key 601. Similarly, the operation key 605 can be operated only when "manage by server" is selected using the operation key 603. When "register for each user" is selected using the operation key 602, "refer to authentication information" and "not refer to authentication information" cannot be selected. That is because, when "register for each user" is selected, the user ID and the password input by the user to login to the MFP 101 are not continuously used, but the username and the password registered on the screen illustrated in FIG. 7 are used.

FIG. 7 illustrates an example of the operation screen displayed on the operation unit 220.

The screen illustrated in FIG. 7 is displayed when a general user operates the MFP 101. The user can register the host name and the path of the user's own folder (the user of A1001 in the example illustrated in FIG. 7) as information 701 and 702. Further, as information 703 and 704, the authentication information (user name and password) for accessing the folder indicated by the information 701 and 702 can be registered. The information registered herein is used when "register for each user" (operation key 602 illustrated in FIG. 6) is selected.

Figure 8:
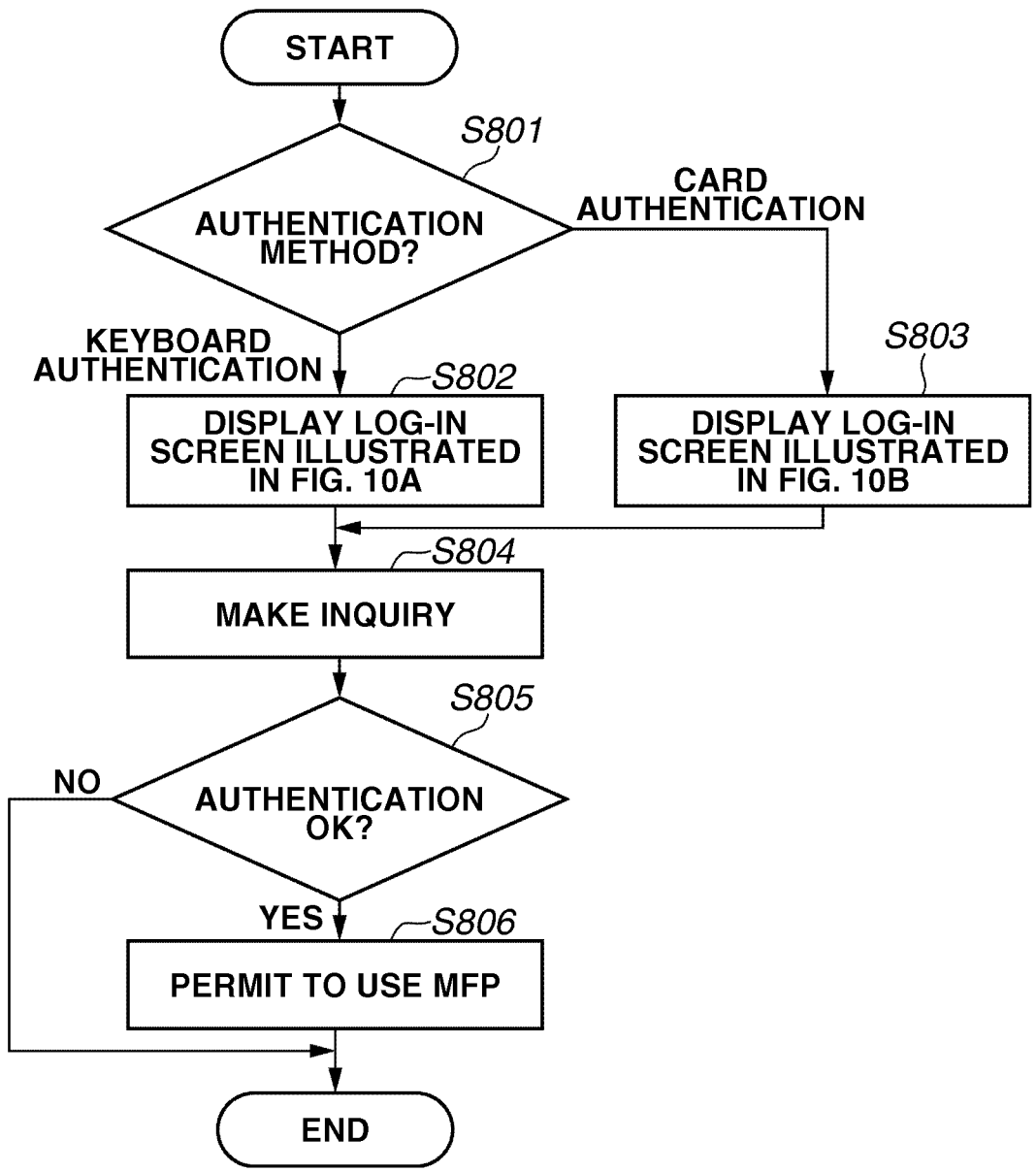
FIG. 8 is a flowchart illustrating a login operation performed by the MFP according to the exemplary embodiment.

FIG. 8 is a flowchart illustrating a login operation (a series of operations when the user starts to use the MFP 101) performed by the MFP 101. Each operation (step) in the flowchart illustrated in FIG. 8 can be realized when the CPU 211 of the MFP 101 executes the control program stored in the HDD 214.

In step S801, it is determined whether the authentication method pre-selected by a system administrator is "keyboard authentication" or "card authentication".

Figure 9:
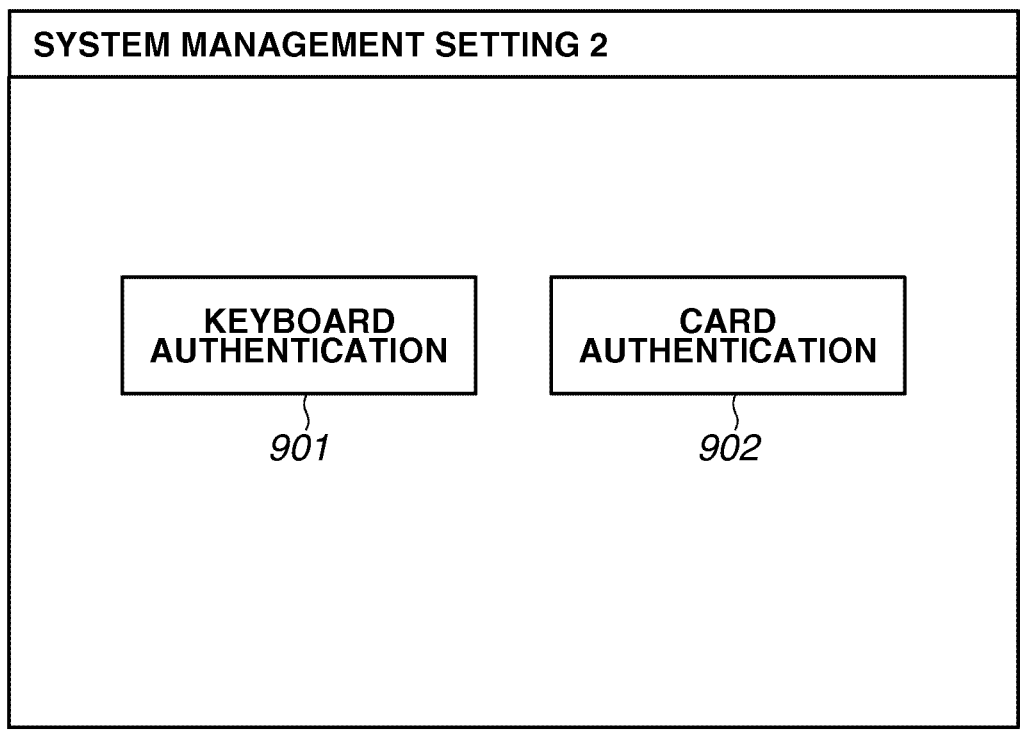
FIG. 9 illustrates an operation screen of the MFP according to the exemplary embodiment.

FIG. 9 illustrates an example of an operation screen displayed on the operation unit 220 enabling the system administrator to select either "keyboard authentication" (operation key 901) or "card authentication" (operation key 902).

When a system administrator pre-selects the operation key 901, it is determined that the authentication method is "keyboard authentication", and the processing proceeds to step S802 to display a screen (reception screen) illustrated in FIG. 10A. On the screen illustrated in FIG. 10A, the user who is going to use the MFP 101 inputs the user's user ID as information 1001 and the user's password as information 1002. This information can be entered by typing in alphanumeric characters and numeral figures using a keyboard (not illustrated). The keyboard may be a hardware keyboard included in the operation unit 220 or a software keyboard displayed on the operation unit 220.

When a system administrator pre-selects the operation key 902, it is determined that the authentication method is "card authentication", and the processing proceeds to step S803 to display a screen illustrated in FIG. 10B. The screen illustrated in FIG. 10B displays a message prompting the user who is going to use the MFP 101 to hold the user's IC card over the card reader 223.

In step S804, the user ID and the password input by the user in step s802 or the user ID read from the IC card via the card reader 223 in step S803 is transmitted to the authentication server 102 to request user authentication. In step S805, it is determined whether the content notified from the authentication server 102 is "authentication OK" or "authentication NG". When "authentication OK" is determined (YES in step S805), the processing proceeds to step S806 to permit the user to use the MFP 101. When "authentication NG" is determined (NO in step S805), the processing ends.

Figure 11:
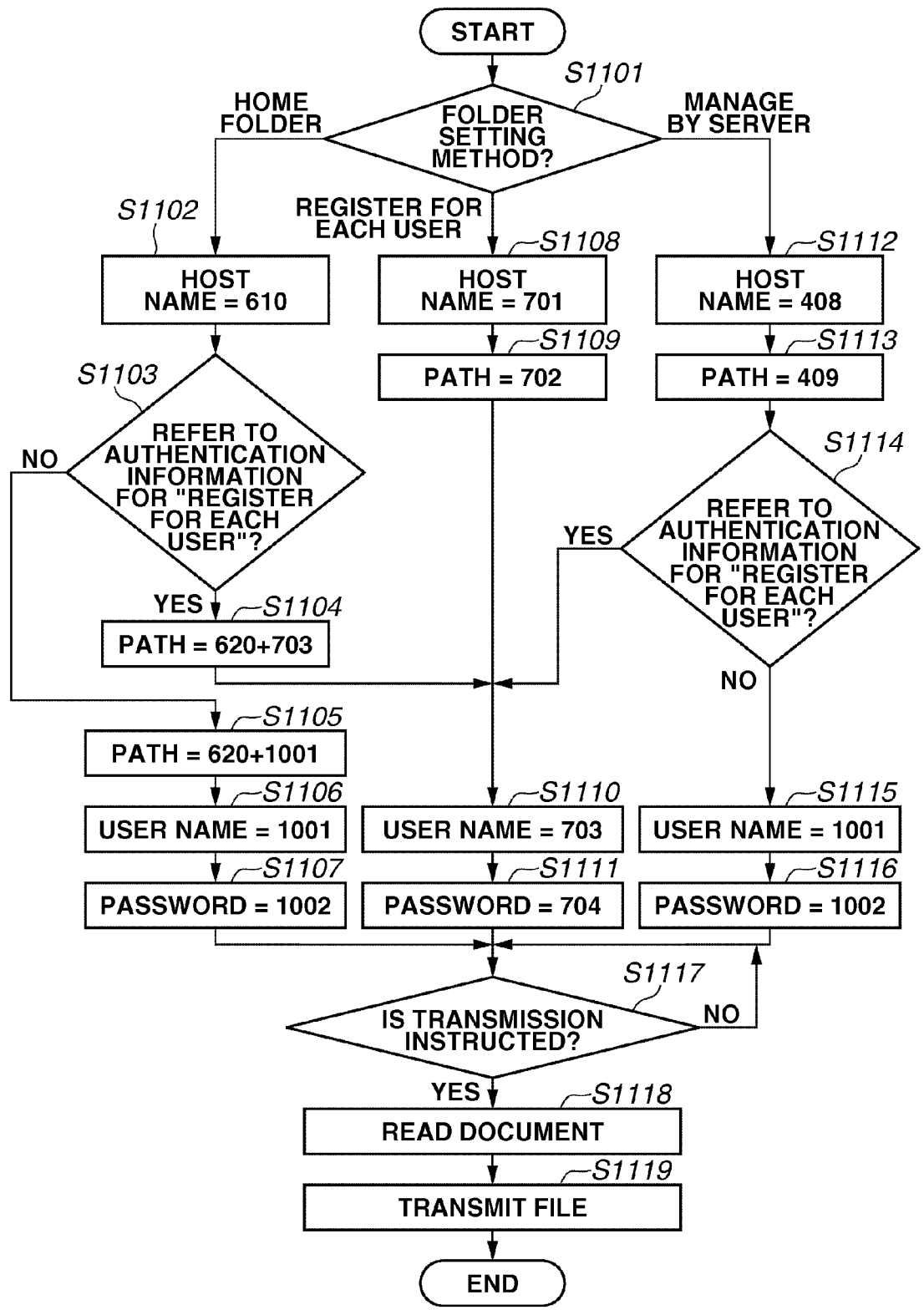
FIG. 11 is a flowchart illustrating an operation performed by the MFP when "transmit file to yourself" is selected according to the exemplary embodiment.

FIG. 11 is a flowchart illustrating a series of operations performed by the MFP 101 when the operation key 514 illustrated in FIG. 5 is operated. Each operation (step) of the flowchart illustrated in FIG. 11 can be realized when the CPU 211 of the MFP 101 executes the control program stored in the HDD 214.

In step S1101, the selected folder setting method is determined. When the selected folder setting method is "home folder", the processing proceeds to step S1102, when it is "register for each user", the processing proceeds to step S1108, and when it is "manage by server", the processing proceeds to step S1112.

In step S1102, the information 610 illustrated in FIG. 6 is set as "host name" for transmitting the file. In step S1103, it is determined whether the setting using the operation key 604 is "refer to authentication information" or "not refer to authentication information". If the setting is "refer to authentication information" (YES in step S1103), the processing proceeds to step S1104. In step S1104, a combination of the information 620 illustrated in FIG. 6 and the information 703 illustrated in FIG. 7 is set as the "path" for transmitting the file. In the example illustrated in FIGS. 6 and 7, "/home/tanaka" is set.

If the setting is "not to refer to authentication information" (NO in step S1103), the processing proceeds to step S1105. In step S1105, a combination of the information 620 illustrated in FIG. 6 and the information 1001 illustrated in FIG. 10 is set as the "path" for transmitting the file.

In step S1106, the information 1001 illustrated in FIG. 10A is set as the "user name" for transmitting the file. In step S1107, information 1002 illustrated in FIG. 10A is set as the "password" for transmitting the file. More specifically, in steps S1106 and S1107, the user ID and the password input by the user to login to the MFP 101 are continuously used as the user name and the password for transmitting the image data in a file.

In step S1108, the information 701 illustrated in FIG. 7 is set as the "host name" for transmitting the file. In step S1109, the information 702 illustrated in FIG. 7 is set as the "path" for transmitting the file. In step S1110, the information 703 illustrated in FIG. 7 is set as the "user name" for transmitting the file. In step S1111, the information 704 illustrated in FIG. 7 is set as the "password" for transmitting the file.

In step S1112, the information 408 illustrated in FIG. 4 is set as the "host name" for transmitting the file. In step S1113, the information 409 illustrated in FIG. 4 is set as the "path" for transmitting the file.

In step S1114, it is determined whether the setting using the operation key 605 indicates "refer to authentication information" or "not refer to authentication information". If the setting is "refer to authentication information" (YES in step S1114), the processing proceeds to step S1110. If the setting is "not refer to authentication information" (NO in step S1114), the processing proceeds to step S1115.

In step S1115, the information 1001 illustrated in FIG. 10A is set as the "user name" for transmitting the file. In step S1116, the information 1002 illustrated in FIG. 10A is set as the "password" for transmitting the file. More specifically, in steps S1115 and S1116, the user ID and the password input by the user to login to the MFP 101 are continuously used as the user name and the password for transmitting the image data in a file.

As described above, when either "home folder" or "manage by server" is selected and when "not refer to authentication information" is selected, the user ID and the password input by the user to login to the MFP 101 are set. With this setting, the authentication information for logging into the MFP 101 and the authentication information as the address of the file transmission are not required to be individually input, thereby reducing the user's works.

When either "home folder" or "manage by server" is selected and "refer to authentication information" is selected, the user name and the password for "manage for each user" are set. With this setting, even when the card authentication, in which the password cannot be continuously used, is performed, the file can be transmitted without the necessity of inputting the password for each login or each file transmission.

Returning to FIG. 11, in step S1117, it is determined whether a transmission instruction (pressing start button) has been received from the user. When the transmission instruction has been received (YES in step S1117), the processing proceeds to step S1118, where the image on the document is read by the scanner 222 so as to generate the image data. In step S1119, using the host name, the path, the user name, and the password that are set in steps S1101 to S1116, the image data is transmitted in a file.

Next, a second exemplary embodiment will be described. The first exemplary embodiment describes the example where an instruction is provided for either "refer to authentication information" or "not refer to authentication information" using the operation keys 604 and 605. The second exemplary embodiment will describe an example where, according to whether the authentication method is "keyboard authentication" or "card authentication", to refer and not to refer the authentication information for "register for each user" are automatically switched.

Figure 12:
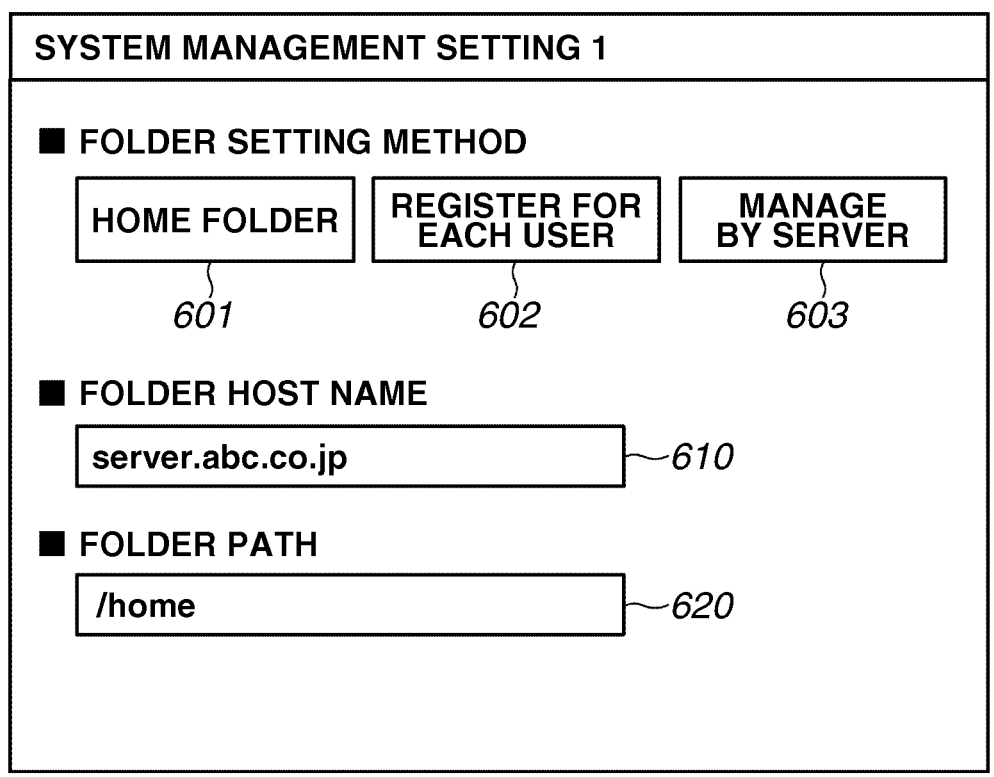
FIG. 12 illustrates an operation screen of the MFP according to the exemplary embodiment.

FIG. 12 illustrates an example of an operation screen displayed on the operation unit 220 according to the second exemplary embodiment in place of the screen illustrated in FIG. 6. The screen illustrated in FIG. 12 can be operated only by a system administrator and, when a general user operates the MFP 101, the screen is not displayed.

In comparing the screen illustrated in FIG. 12 with screen illustrated in FIG. 6, the operation keys 604 and 605 are not displayed in FIG. 12. In other words, "refer to authentication information" and "not refer to authentication information" cannot be selected via the screen illustrated in FIG. 12.

FIG. 13 is a flowchart illustrating a series of operations performed by the MFP 101 when the operation key 514 illustrated in FIG. 5 is operated. Each operation (step) of the flowchart illustrated in FIG. 13 can be realized when the CPU 211 of the MFP 101 executes the control program stored in the HDD 214.

The operation (steps) of FIG. 13 are identical to those of FIG. 11, except that steps 1301 and 1302 in FIG. 13 replace steps S1103 and S1114 from FIG. 11. Thus only descriptions of steps 1301 and 1302 will be provided.

In step S1301, it is determined whether the authentication method that has been pre-selected by a system administrator is "keyboard authentication" or "card authentication". When the system administrator has pre-selected the operation key 901, it is determined that the authentication method is "keyboard authentication", and the processing proceeds to step S1105. When the system administrator has pre-selected the operation key 902, it is determined that the authentication method is "card authentication", and the processing proceeds to step S1104.

In step S1302, it is determined whether the authentication method that has been pre-selected by a system administrator is "keyboard authentication" or "card authentication". When the system administrator has pre-selected the operation key 901, it is determined that the authentication method is "keyboard authentication", and the processing proceeds to step S1115. On the other hand, when the system administrator has pre-selected the operation key 902, it is determined that the authentication method is "card authentication", and the processing proceeds to step S1110.

As described above, according to the second exemplary embodiment, when either "home folder" or "manage by server" is selected, and when "keyboard authentication" is performed, the user ID and the password input by the user to login to the MFP 101 are set. With this setting, the authentication information for logging into the MFP 101 and the authentication information as the address for the file transmission are not required to be individually input, thereby reducing the user's workload.

When either "home folder" or "manage by server" is selected, and when "card authentication" is performed, the user name and the password for "manage for each user" are set. With this setting, even when the card authentication, in which the password cannot be continuously used, is performed, the file can be transmitted without the necessity of inputting the password for each login or each file transmission.

The above-described first and second exemplary embodiments provide examples of setting authentication information used to transmit image data. However, setting of the authentication information as described in the first and second exemplary embodiments can be applied to various types of processing on the image data, including the transmission thereof. For example, if the authentication information is required to store the image data in a memory inside the image processing system, the methods described in the first and second exemplary embodiments can be applied to the setting of the authentication information.

Embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-100974 filed Apr. 26, 2012, which is hereby incorporated by reference herein in its entirety.

What is claimed is:

1. An image processing system comprising:
a receiving unit configured to receive authentication information from a user;
a performing unit configured to perform login of a user based on the authentication information received by the receiving unit;
an operation key configured to set a folder which has been pre-registered in association with the user as a transmission destination of image data;
a transmission unit configured to transmit image data using authentication information to the transmission destination set by operation of the operation key; and
a selection unit configured to select whether to set, as authentication information to be used when accessing the transmission destination set by operation of the operation key, the authentication information which is received by the receiving unit or to set, as authentication information to be used when accessing the transmission destination set by the operation key, authentication information which has been pre-registered in association with the user.

2. An image processing apparatus comprising:
a receiving unit configured to receive authentication information from a user;
a performing unit configured to perform login of a user based on the authentication information received by the receiving unit;
an operation key configured to set a folder which has been pre-registered in association with the user as a transmission destination of image data;
a selection unit configured to select whether to set, as authentication information to be used when accessing the transmission destination set by operation of the operation key, the authentication information which is received by the receiving unit or to set, as authentication information to be used when accessing the transmission destination set by operation of the operation key, authentication information which has been pre-registered in association with the user.

3. The image processing apparatus according to claim 2, further comprising a display unit configured to display an operation screen for selecting whether to set the authentication information which is received by the receiving unit or to set authentication information which has been pre-registered in association with the user,
wherein the selection unit is configured to perform the selection according to an instruction received by the operation screen displayed by the display unit.

4. The image processing apparatus according to claim 2, further comprising
a setting unit configured to set, when the transmission destination of the image data is set by operation of the operation key, authentication information according to selection by the selection unit.

5. The image processing apparatus according to claim 2, wherein the transmission destination is a host name and a path of a folder.

6. The image processing apparatus according to claim 2, wherein the authentication information includes a user ID and a password.

7. The image processing apparatus according to claim 2, wherein, in a case where the user is authenticated based on authentication information input using a keyboard, the selection unit selects to set the authentication information which is received by the receiving unit, and in a case where the user is authenticated based on information recorded in a mobile recording medium, the selection unit selects to set the authentication information which has been pre-registered in association with the user.

8. A method for controlling an image processing apparatus, the method comprising:
receiving authentication information from a user;
performing login of a user based on the received authentication information;
setting, by operation of an operation key, a folder which has been pre-registered in association with the user as a transmission destination of image data;
transmitting image data using authentication information to the transmission destination set by operation of the operation key; and
selecting whether to set, as authentication information to be used when accessing the designated transmission destination set by operation of the operation key, the authentication information which is received by the receiving unit or to set as authentication information to be used when accessing the transmission destination set by operation of the operation key, authentication information which has been pre-registered in association with the user.

9. The method for controlling the image processing apparatus according to claim 8, further comprising displaying an operation screen for selecting whether to set the received authentication information or to set authentication information which has been pre-registered in association with the user,
wherein the selecting is performed according to an instruction received by the displayed operation screen.

10. The method for controlling the image processing apparatus according to claim 8, further comprising,
setting, when the transmission destination of the image data is set by operation of the operation key, authentication information according to the selection.

11. The method for controlling the image processing apparatus according to claim 8, wherein the transmission destination is a host name and a path of a folder.

12. The method for controlling the image processing apparatus according to claim 8, wherein the authentication information includes a user ID and a password.

13. The method for controlling the image processing apparatus according to claim 8, wherein in the selecting, in a case where the user is authenticated based on the authentication information input using a keyboard, setting the authentication information which is received by the receiving unit is selected, and in a case where the user is authenticated based on information recorded in a mobile recording medium, setting the authentication information which has been pre-registered in association with the user is selected.

14. A non-transitory computer readable storage medium storing a program for causing a computer to execute a method for controlling an image processing apparatus, the method comprising:
  receiving authentication information from a user;
  performing login of process of a user based on the received authentication information;
  setting, by operation of an operation key, a folder which has been pre-registered in association with the user as a transmission destination of image data;
  transmitting image data using authentication information to the transmission destination set by operation of the operation key; and
  selecting whether to set, as authentication information to be used when accessing the designated transmission destination set by operation of the operation key, the authentication information which is received by the receiving unit or to set as authentication information to be used when accessing the designated transmission destination set by operation of the operation key, authentication information which has been pre-registered in association with the user.

\* \* \* \* \*